United States Patent [19]

Pritchard

[11] 3,996,606
[45] Dec. 7, 1976

[54] COMB FILTER FOR VIDEO PROCESSING

[75] Inventor: Dalton Harold Pritchard, Princeton, N.J.

[73] Assignee: RCA Corporation, New York, N.Y.

[22] Filed: Mar. 18, 1975

[21] Appl. No.: 559,401

[52] U.S. Cl. .................................... 358/8; 358/21
[51] Int. Cl.² .................................... H04N 5/76
[58] Field of Search ............... 358/4, 8, 35, 38, 21; 360/36

[56] References Cited
UNITED STATES PATENTS

| | | | |
|---|---|---|---|
| 3,769,449 | 10/1973 | Inoue | 358/8 |
| 3,820,154 | 6/1974 | Faroudja | 358/8 |
| 3,863,022 | 1/1975 | Bruch | 358/8 |
| 3,871,019 | 3/1975 | Bingham | 358/4 |
| 3,872,497 | 3/1975 | Amery et al. | 358/4 |
| 3,872,498 | 3/1975 | Pritchard | 358/21 |
| 3,879,748 | 4/1975 | De Boer | 358/8 |
| 3,886,589 | 5/1975 | Nasu | 358/8 |
| 3,921,202 | 11/1975 | Dann et al. | 358/8 |

OTHER PUBLICATIONS

W. Hannan et al., IEEE Trans. on Mil. Elect., Autom. Correction of Timming etc., July–Oct., 1965, pp. 246–254.

Primary Examiner—Robert L. Griffin
Assistant Examiner—Aristotelis M. Psitos
Attorney, Agent, or Firm—Eugene M. Whitacre; Stephen Siegel; William H. Meagher

[57] ABSTRACT

Apparatus provides improved comb filtering of color video signals subject to frequency errors. A charge transfer delay line, part of a comb filter, is caused to vary in delay time in consonance with the frequency errors in the color video signal. A modulator, frequency translates the color video signal such that an associated color synchronization component is translated to a desired frequency. The color synchronization component is compared in frequency to a reference and difference signal generated to control the delay of the above-mentioned delay line and stabilize the frequency of the color synchronization component.

12 Claims, 1 Drawing Figure

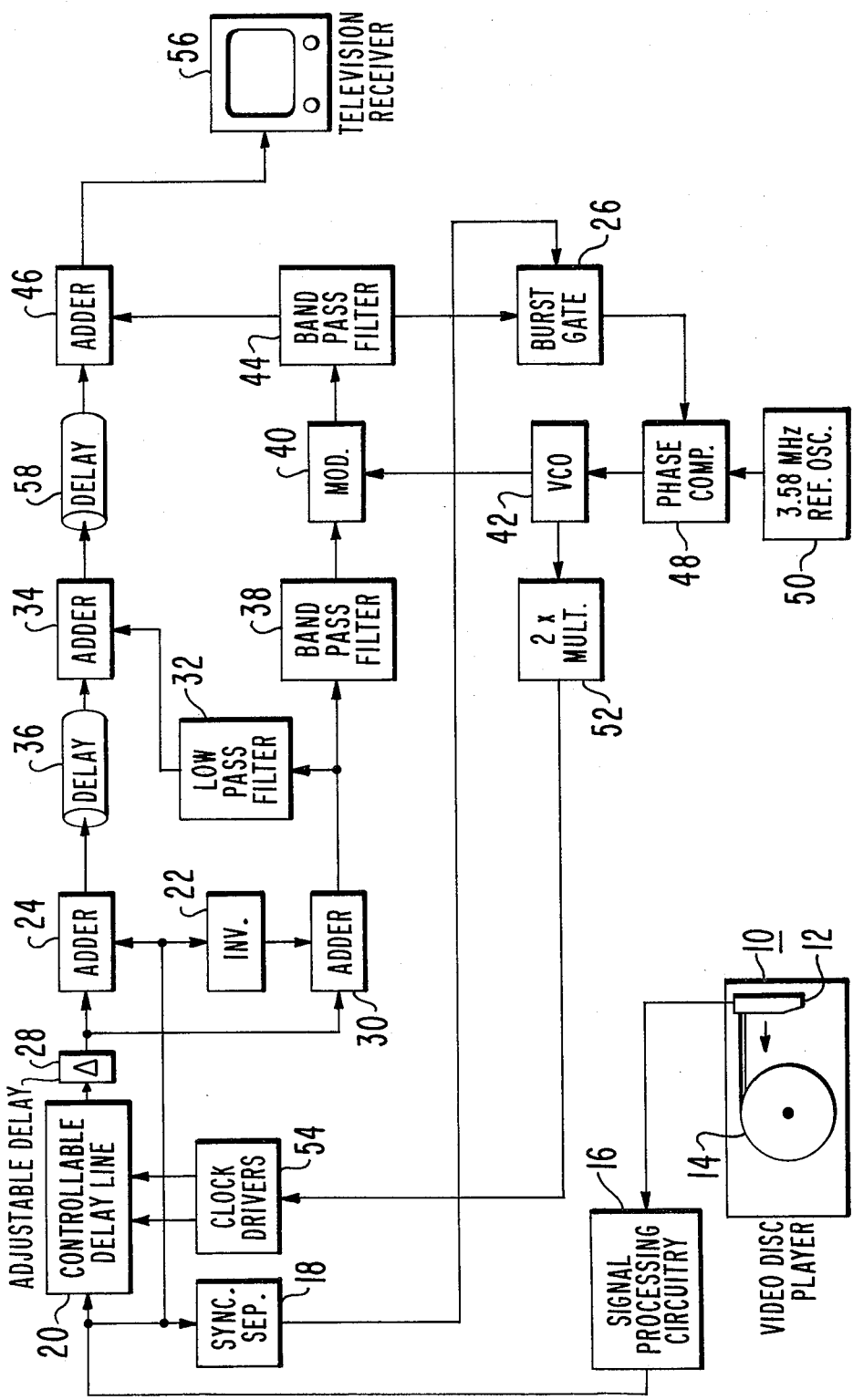

COMB FILTER FOR VIDEO PROCESSING

This invention relates to video signal processing and more particularly to apparatus for comb filtering and rearranging the luminance and chrominance signal components of a composite video signal from one format to another.

In my copending U.S. application entitled, COLOR INFORMATION TRANSLATING SYSTEMS, Ser. No. 350,777, now U.S. Pat. No. 3,872,498, a color signal encoding format is disclosed wherein a chrominance signal component in the form of a modulated subcarrier is interlaced in the midband of a wider band luminance signal. An encoded video signal of this type, referred to as a buried subcarrier signal, may be formed by first comb filtering the luminance signal component at least over the frequency range where chrominance signal components are to be inserted. By filtering this region of the luminance signal with an appropriate comb filter, troughs in the signal at frequencies corresponding to odd multiples of one-half the horizontal line frequency may be prepared for insertion of the associated chrominance signal. Similarly, the chrominance signal components may be comb filtered in a manner to form troughs in this signal at frequencies that correspond to even multiples of one-half the horizontal line frequency. By placing the chrominance signal components on an appropriate carrier signal, the luminance and chrominance components may be interleaved within the passband of the luminance components.

The above-described buried subcarrier signal format is particularly useful for information storage in video discs for reasons delineated in my aforementioned patent application. One type of video disc reproducing system that employs the buried subcarrier format utilizes apparatus that senses the capacitance between a stylus playback device and a disc record to reconstruct the video information embossed within a spiral groove on the record. In such systems, the video information is recorded in the form of geometric variations in the spiral groove on the surface of the record. The disc surface may include a conductive material covered with a thin coating of dielectric material. A metal electrode associated with the stylus playback device cooperates with the conductive material and dielectric coating to form a capacitor. Capacitance variations due to the signal representative geometrical variations in the spiral groove are sensed and decoded to provide a video representative output signal. A detailed description of a capacitive video disc system is provided in U.S. Pat. No. 3,842,194, issued to Jon K. Clemens on Oct. 15, 1974.

In one arrangement, it may be desirable to interface a video disc player with an unmodified television receiver or monitor. To facilitate the use of such unmodified receiver, the buried subcarrier signal information that is provided by the video disc player may be rearranged (transcoded) into a signal format such as that prescribed by the National Television Standards Committee (NTSC). By rearranging the video signal into a format such as PAL or NTSC, signal decoding may be achieved by appropriate standard television circuitry. An NTSC type of signal, for example, may be formed from a buried subcarrier signal by removing the chrominance information from within the luminance signal passband and translating it in the form of sidebands of a relatively low frequency subcarrier to sidebands of a subcarrier at a frequency such as 3.58 MHz where it may then be reinserted with the luminace signal component. A system which provides transcoding of buried subcarrier signals into NTSC type of signals is described in my aforementioned, copending U.S. patent application.

Signal transcoding systems such as the one described in my above-referenced patent application generally employ comb filters to separate luminance and chrominance signal components from a composite video signal. These comb filters typically utilize a delay line having a substantially constant delay for deriving the requisite comb filter characteristic. Composite video signals, however, that are derived from the rotating video disc may be subject to velocity errors which may be due, for example, to disc warpage or eccentricity of the information storing spiral groove with respect to the center hole in the disc. As a result of this, the signals detected by an associated signal pickup arm may be received at alternately faster and slower speeds than that at which they were recorded. Such video signals generally have a frequency spectrum with abnormally spaced components. That is, instead of the components in the energy density spectrum being bunched about frequency multiples of the horizontal scan frequency, they are spaced about other frequencies. Therefore, if a comb filter is constructed which utilizes a delay line having a substantially constant delay (the period of a horizontal scan line), the resultant comb filter characteristic produced may at times provide imprecise combing of the composite signal. Such imprecise combing may result in a luminance channel output signal which contains chrominance signal information. If chrominance signal information is present in the luminance channel, the resultant video image when reproduced on a monitor will contain dots at the chrominance subcarrier frequency which may detrimentally effect the resultant image.

A system which provides precise comb filtering of the signal components of a composite video signal that has been subjected to velocity errors includes a means for receiving such composite video signals. A controllable delay means is coupled to this receiving means and provides a controllable amount of delay to the applied composite video signals. Control means responsive to the frequency errors of the composite video signal are coupled to the delay means and responsively control the amount of delay, and means for combining signals provided at the input and output of the delay means produces a comb filtered video signal.

In a further aspect of the present invention, a modulator frequency translates signals provided by the combining means such that a color synchronization component associated with the color video signals is translated to a predetermined frequency. A detector senses the color synchronization components and compares these to signals provided by a reference frequency source. Signals representative of the phase difference between the reference signals and color synchronization components are used to control delay time of the controllable delay line and the above-mentioned predetermined frequency.

A better understanding of the invention may be derived from the following specification when taken with the accompanying drawing of which:

FIG. 1 is a block diagram of a signal transcoding system embodying the invention.

With reference to the drawing, a video disc player 10 has a signal pickup arm 12 arranged to extract signal information from a rotating disc 14. Signals derived at the output of pickup arm 12 are coupled to signal processing circuitry 16. Processed signal information provided at the output of circuit 16 is coupled to a sync separator 18, a controllable delay line 20, an inverter 22 and an adding circuit 24. Sync separator 18 operates in part to extract horizontal sychronization pulses from the applied signal and provides these pulses to a burst gate 26. Delay line 20 is a baseband, delay-controllable analog delay line. This delay line may be a charge transfer device employing, for example, the bucket brigade or charge coupled technique. A trimmer delay line 28 is coupled to the output of delay line 20 and provides an adjustable delay to compensate for relatively small delays associated with circuitry utilized to control the delay time of delay line 20. A first adder circuit 24 receives signals from delay line 28 and processing circuitry 16 and combines these signals to produce a comb filter characteristic. A second adder 30 receives signals from both the output of delay line 28 and processing circuit 16. The signals received from processing circuit 16 are inverted in polarity by inverter 22. A low-pass filter 32 passes the low frequency portion of the signals provided at the output of adder 30 to a third adder 34. Adder 34 receives signals from the first adder 24 through a delay line 36.

A bandpass filter 38 having a bandwidth of about 1 MHz and a center frequency of about 1.53 MHz is coupled to the output of adder 30. Signals provided at the output of filter 38 are coupled to a modulator 40. Modulator 40 heterodynes the signals provided by filter 38 with signals provided by a VCO 42. A bandpass filter 44 having a bandwidth of about 1 MHz centered about a frequency of 3.58 MHz receives signals from modulator 40. Signals provided at the output of bandpass filter 44 are coupled to a fourth adder 46 and a burst gate 26. Burst gate 26 receives control signals from sync separator 18 and responsively provides signals to a phase comparator 48. Phase comparator 48 further receives signals from a reference oscillator 50 and compares these signals with the signals provided by burst gate 26. Signals provided at the output of comparator 48 are coupled to VCO 42. VCO 42 has an output coupled to both modulator 40 and two-times multiplier 52. A clock driver 54 receives signals from multiplier 52 and provides two antiphased clock signals to delay line 20.

Adder 46 further receives signals from third adder 34 through a delay line 58. Signals provided at the output of adder 46 are coupled to a television receiver 56.

In the operation of the above-described circuitry, a video disc 14 is rotated on an associated turntable of player 10 and a pickup arm 12 positioned over the information storing groove. Signal information extracted from the video disc is coupled to signal processing circuitry 16 wherein the coded video signal is demodulated to provide an amplitude modulated signal containing the recorded video signal information. Video signal information provided at the output of processing circuit 16 is in a buried subcarrier format. That is, the chrominance signal information is interleaved within the midband of a wider band luminance signal component. Illustratively, the chrominance signal information is arranged to be in the form of sidebands of about 500 KHz width on each side of a subcarrier component of 1.53 MHz, and the luminance signal component arranged to cover a bandwidth of 0 to 3 MHz.

As mentioned above, signal information provided by video disc 14 may be subjected to velocity errors due, for example, to disc warpage or eccentricity of the information-storing spiral groove with respect to the center hole in the disc. These velocity errors are generally recurrent with each revolution of the disc record causing the instantaneous frequency of the derived video information to jitter about their originally recorded frequencies. Such frequency component jitter typically causes undesirable undulation in the vertical components of the displayed impage.

In order to transcode the composite video signal, it is desirable to separate the interleaved luminance and chrominance signal components. To produce the desired signal component separation, comb filters may be employed. A comb filter, as generally known in the art, is comprised of at least one delay line and a signal combining circuit. For example, a comb filter suitable for use with composite video signals may be comprised of a delay line having a delay time of substantially one horizontal line (1H) and a combining circuit for combining delayed and nondelayed signals. A comb filter of this type is effective for combing luminance and chrominance signal information from a composite video signal when the frequency characteristics of the applied video signal are relatively stable. The output signals provided by the video disc player, however, are generally not stable and therefore the comb filter response produced at the output of a typical comb filter that utilizes a fixed delay line will not necessarily provide a comb characteristic that is desirable for accurately separating the luminance and chrominance signal components. In order then to more precisely comb the jittering video signal, it is desirable to be able to shift the comb characteristic correspondingly with the jitter of the composite signal.

Delay line 20 is a controllable delay line having a delay which may be varied in accordance with the corresponding jitter of the composite video signal. By responsively shifting the delay time of delay line 20 in accordance with input signal jitter, a comb filter may be created that is able to shift its comb characteristic to follow the jitter of the applied input signal. The resulting comb characteristic of this filter jitters in consonance with the applied input signal to provide relatively precise combing.

Delay line 20 has its delay time controlled by clock signals provided by clock driver 54. Clock driver 54 provides two antiphase clock signals suitable for driving either a bucket brigade or two-phase charge coupled delay line. A two-phase charge transfer delay line is shown in U.S. Pat. No. 3,760,202, in the name of W. F. Kosonocky, assigned to RCA Corporation. If a three-phase charge coupled delay line is utilized, clock driver 54 may be further arranged to provide three-phase clock output signals. An adjustable delay line 28 is coupled to the output of controllable delay line 20 and provides the necessary amount of delay to compensate for any delay lag in the signals provided by clock circuit 54. The amount of delay provided by delay line 28 is relatively small and is added to the delay provided by delay line 20 in order to yield a total delay time of approximately 1H delay. Adder circuit 24 receives delayed composite video signals provided by the delay line 28 and also receives nondelayed composite video signals from processing circuit 16. Since the delay time of delay line 20 is varied in consonance with the jitter of the composite signal, both the composite and delayed signals received by adder 24 are in proper delay relationship with each other. The filter formed be delay lines 20 and 28 and adder 24 is a comb filter having a frequency response characteristic similar in shape to a full wave rectified sine wave. This filter operates to pass substantially only the luminance signal components of the applied composite video signal.

An inverting amplifier 22 coupled to signal processing circuit 16 inverts the composite video signal applied to its input terminal and provides this inverted signal to adder 30. Adder 30 combines nondelayed and delayed signals provided respectively by inverter 22 and delay line 28 to produce a comb filter having a frequency response characteristic of substantially the same shape as that of the comb filter characteristic produced at the output of adder 24; however, the response characteristic at the output of adder 24 is about 180° phase shifted with respect to that provided at the output of adder 30. Substantially only chrominance signal components of the composite video signals applied to this filter are provided at the associated output terminal.

The luminance and chrominance signals have frequency spectrums with energy peaks respectively located about frequencies corresponding to one-half of an odd multiple of the horizontal frequency and one-half of an even multiple of the horizontal frequency. Nulls in the frequency spectrum of the luminance and chrominance components respectively occur at frequencies corresponding to energy peaks in the frequency spectrum of the chrominance and luminance components. The respective frequency spectrums of the luminance and chrominance signals may have overlapping signal components in regions between the respective odd and even frequency multiples mentioned above. One type of signal component that appears in the overlapping signal region is the vertical detail information that corresponds to diagonal lines in the corresponding reproduced image. If, in decoding the video information, the chrominance signal is combed away from the composite signal, a portion of the vertical detail information in the overlap regions may become lost. To restore the vertical detail removed by comb filtering, a portion of the signal information derived at the output of adder 30 (the chrominance channel output) is added to the combed luminance signal. Since a generally adequate amount of vertical detail information is present in the first 500 KHz of the composite video signal, a low-pass filter 32 having a bandpass of about 500 KHz is utilized to pass the low frequency portion of the signals provided at the output of adder 30 to the combed luminance signal provided by adder 24. Adder 34 is utilized to combine the combed luminance signal with those signals provided by filter 32. A delay line 36, interposed between adders 24 and 34, provides a sufficient delay to the combed luminance signals to maintain a proper phase relationship between these signals and those provided by low-pass filter 32.

A bandpass filter 38 receives combed chrominance signals from adder 30 and operates to suppress signals at frequencies other than those occupied by the chrominance components. Combed chrominance signals provided at the output of filter 38 are coupled to modulator 40 where they are heterodyned with a signal provided by VCO 42. VCO 42 has a nominal output frequency of about 5.11 MHz which is mixed with the combed chrominance signal components in modulator 40 to translate these components from sidebands of a 1.53 MHz subcarrier to sidebands of a 3.58 MHz subcarrier. Bandpass filter 44 is designed to pass the 3.58 MHz subcarrier and associated sideband components and suppress any undesired modulation products produced by modulator 40.

In like manner to NTSC video signals, a chrominance subcarrier reference burst signal is recorded on the video disc during the back porch interval of the horizontal sync signals. This reference burst signal has a nominal frequency of 1.53 MHz when recorded on the video disc and is translated up in frequency to about 3.58 MHz by the aforementioned modulator 40. Burst gate 26 receives and passes these reference burst signals to phase comparator 48 in response to horizontal sync pulses received from sync separator 18. Phase comparator 48 compares the phase of 3.58 MHz reference signal provided by reference oscillator 50 with the phase of the burst signal component and provides a resultant error signal which is used to control the output frequency of VCO 42. The error signal provided by phase comparator 48 causes the output frequency of VCO 42 to jitter in a corresponding manner to the jitter associated with the signal provided from the video disc. By appropriately jittering the frequency of VCO 42, the 3.58 MHz chrominance subcarrier signal can be made relatively stable and free from the jitter associated with the signal provided at the output of processing circuit 16. The jitter responsive signal provided by VCO 42 is further utilized for controlling the delay of controllable delay line 20. By multiplying the output frequency of VCO 42 by two, a clock signal of approximately 10.22 MHz is generated. The output signal from multiplier 52 is coupled to clock driver 54 wherein two antiphase clock signals are produced for driving, for example, a bucket brigade or charge coupled type of delay line such as delay line 20. Delay line 20 is comprised of 647 delay elements. The number of delay elements is selected in accordance with the desired amount of delay (approximately 63.5 microseconds) and the clock frequency (about 10.22 MHz). The relatively high clock frequency is utilized in order to insure recovery of the phase information of the 1.53 MHz subcarrier signal.

Stabilized combed chrominance signal components provided at the output of filter 44 are coupled to adder 46 where they are added to the combed luminance signal provided at the output of adder 34. A delay line 58 coupled between adders 34 and 46 provides the necessary delay to maintain a proper phase relationship between the combed luminance and chrominance signal components. The combined signal (luminance and chrominance) provided at the output of adder 46 has a luminance component of substantially 3 MHz bandwidth and a chrominance component that has a subcarrier frequency of 3.58 MHz with sidebands from about 3 to 4 MHz. This is a transcoded video signal, i.e., the chrominance signal components have been translated from a lower frequency subcarrier within the 3 MHz bandpass of the original composite video signal to frequencies about a 3.58 MHz subcarrier. This signal is similar to the NTSC type of signal and may easily be decoded by a television receiver, such as receiver 56.

What is claimed is:
1. A system for processing composite color video signals including a luminance component occupying a given band of frequencies and a chrominance component interleaved with said luminance component over only a portion of said given band and inclusive of a color synchronization component, said composite color video signal components being concomitantly subject to spurious frequency variations; said system comprising:

said composite color video signals;

controllable delay means coupled to said receiving means for imparting a controllable amount of delay to said composite color video signals;

first comb filter means, including means for subtractively combining signals provided by said delay means and said receiving means, for filtering said composite color video signals in accordance with a first comb filter characteristic having multiple rejection notches falling at a first plurality of spaced frequencies;

second comb filter means, including means for additively combining signals provided by said delay means and said receiving means, for filtering said composite color video signals in accordance with a second comb filter characteristic having multiple rejection notches falling at a second plurality of frequencies interleaved with said first plurality of spaced frequencies; and means, selectively responsive to spurious variations of the frequency of the color synchronization component of said composite color video signals and coupled to said controllable delay means, for varying the delay imparted thereby concomitantly with said spurious variations of the frequency of said color synchronization component and in a sense establishing an inverse relationship between said frequency variations and the concomitant delay variations so as to cause variations of said first and second pluralities of spaced frequencies of said comb filter characteristics in consonance with the sense and timing of said spurious frequency variations of said composite color video signal components;

means coupled to an output of said first comb filter means for frequency translating components of said composite color video signals passed by said first comb filter means and falling within said portion of said given band;

a low pass filter, having a cutoff frequency falling below said portion of said given band, coupled to an output of said first comb filter means; and an adder, responsive to outputs of said second comb filter means, said low pass filter, and said frequency translating means for forming an output composite color signal.

2. Apparatus according to claim 1 wherein:

said controllable delay means comprises a clock controlled charge transfer device having an analog signal input terminal coupled to said receiving means, an analog signal output terminal coupled to said respective combining means, and clock signal input terminals.

3. Apparatus according to claim 2 wherein:

said delay varying means includes means for supplying clock signals, with a frequency subject to variation in consonance with the sense and timing of said spurious frequency variations of said color synchronization component, to said clock signal input terminals to control the delay time of said charge transfer device.

4. Apparatus according to claim 3 wherein:

said delay varying means further includes a reference frequency oscillator;

a phase comparator responsive to signals provided by said reference oscillator and to said color synchronization component;

a voltage controlled oscillator coupled to said phase comparator for providing an output signal with frequency deviation responsive to the difference in phase between said synchronization component and said signals provided by said reference frequency oscillator; and means for deriving said clock signals from an output of said voltage controlled oscillator.

5. Apparatus in accordance with claim 3 also including:

means, coupled to an output of said frequency translating means, for selectively passing a frequency translated version of said color synchronization component;

a reference oscillator;

a phase comparator responsive to outputs of said reference oscillator said selective passing means; and a voltage controlled oscillator;

wherein said frequency translated means is responsive to an output of said voltage controlled oscillator; and wherein an output of said phase comparator is supplied to said voltage controlled oscillator to control the frequency of said output thereof in a sense tending to stabilize the outputs of said frequency translating means against said spurious frequency variations.

6. Apparatus in accordance with claim 5 wherein said delay varying means also includes means coupled between said voltage controlled oscillator and said clock signal supplying means for deriving said clock signals from an output of said voltage controlled oscillator.

7. Apparatus in accordance with claim 6 wherein said clock signal deriving means comprises a frequency multiplier responsive to an output of said voltage controlled oscillator.

8. Apparatus in accordance with claim 3 wherein said delay varying means also includes:

a voltage controlled oscillator;

means for rendering the frequency of an output of said voltage controlled oscillator responsive to spurious frequency variations of said color synchronization component; and means for deriving said clock signals from said output of said voltage controlled oscillator.

9. In a system for playback of recorded composite color video signals, including a luminance component occupying a given frequency band, and a chrominance component interleaved with said luminance component over only an intermediate portion of said given band and accompanied by a color synchronization component, said composite color video signal components being concomitantly subject to spurious frequency variations in the course of playback; apparatus for processing the composite color video signals recovered during said playback comprising:

a clock controlled charge transfer delay line receptive to said composite color video signals recovered during playback;

a first comb filter means, including means for subtractively combining delayed signals provided at the output of said delay line with undelayed composite color video signals, for subjecting said composite color video signals to a first frequency response characteristic having multiple rejection notches lying at a first plurality of spaced frequencies;

a modulator coupled to an output of said combining means for frequency translating signals provided thereat;

separating means coupled to an output of said modulator for separating a frequency translated version of said color synchronization component from said frequency translated signals;

a source of reference signals having a frequency substantially equal to that of said frequency translated version of the color synchronization component in the absence of said spurious frequency variations;

phase comparator means coupled to said source of reference signals and said separating means for developing an output indicative of the phase relationship between said reference signals and said frequency translated version of said color synchronization component;

means responsive to said output of said comparator means for stablizing the component frequencies of said frequency translated signals; and means, responsive to spurious variations of the frequency of the color synchronization component of said recovered composite color video signals, for supplying clock signals to said delay line, with the frequency of said clock signals varying in consonance with the spurious frequency variations of said composite color video signal components so as to effect a variation of said first plurality of spaced frequencies with a sense and timing consonant with said spurious frequency variations of said composite color video signal components.

10. Apparatus in accordance with claim 9 also including:

second comb filtering means, including means for additively combining delayed signals provided at the output of said delay line with undelayed composite color video signals, for subjecting said composite color video signals to a second frequency response characteristic having multiple rejection notches lying at a second plurality of spaced frequencies interleaved with said first plurality;

a low pass filter, having a cutoff frequency falling below said portion of said given band, coupled to an output of said first comb filtering means;

a bandpass filter, having a passband lying above said given band, coupled to an output of said modulator; and an adder, responsive to the outputs of said low pass filter, said bandpass filter, and said second comb filtering means, for forming an output composite signal.

11. Apparatus in accordance with claim 10 wherein said stabilizing means includes a voltage controlled oscillator responsive to the output of said phase comparator means; and wherein said modulator utilizes an output of said voltage controlled oscillator in effecting the frequency translation of the signals provided at the output of said subtractive combining means.

12. Apparatus in accordance with claim 11 also including means for deriving said clock signals from an output of said voltage controlled oscillator.

* * * * *